Dec. 5, 1933.     J. GALAMB     1,937,952
VENTILATOR

Filed Nov. 19, 1930

Witness.
E. C. McRae.

INVENTOR.
J. Galamb.
BY E. L. Davis
ATTORNEY.

Patented Dec. 5, 1933

1,937,952

UNITED STATES PATENT OFFICE 1,937,952

VENTILATOR

Joseph Galamb, Detroit, Mich., assignor to Ford Motor Company, Dearborn, Mich., a corporation of Delaware Application November 19, 1930
Serial No. 496,699

5 Claims. (Cl. 98—2)

The object of my invention is to provide a ventilator of simple, durable and inexpensive construction.

A further object of my invention is to provide a ventilator especially adapted for use on automobiles, airplanes, or other vehicles. The ventilation of such vehicles, especially in the case of closed automobile bodies, is very important as in warm weather the heat from the engine would without ventilation make the front portion of the car uncomfortable. With my improved device I am able not only to ventilate the front portion of the automobile to thereby release the excess heat therein, but also a cross ventilation through this compartment is provided which effectively cools the driver's feet.

Still a further object of my invention is to provide a ventilator which may be conveniently adjusted to selectively exhaust the air from the driving compartment or to conduct cool air into this compartment at the will of the driver. Most car ventilators consist of a hinged door which may be adjustably raised or lowered to open or close the ventilator. Under most driving conditions it is desirable to hinge the door at the rear of the car so that when it is opened outwardly it will deflect the air downwardly into the car. However, if it is desirable to exhaust the air from the car, to thereby secure ventilation during a rain storm or when traveling over a dusty road, it is obvious that the door should be hinged at the front to so function. My improved device is so constructed that the driver may selectively operate the vane to give the effect of being hinged either at the front or at the rear to thereby affect an injection or exhaustion of the air in the car.

In this device I provide a vane member which in its inoperative position closes an opening in the side of the car. The vane is so hinged that its center may be swung away from the car and the vane then pivoted around this center to bring either the forward or rear edge of the vane in contact with the edge of the opening to thereby effect the exhaustion or injection of the air. If desired the vane may be placed parallel to or at an angle relative to the body while in its open position where it will be seen that a nice adjustment will easily be had.

With these and other objects in view my invention consists in the arrangement, construction and combination of the various parts of my improved device, as described in the specification, claimed in my claims, and illustrated in the accompanying drawing, in which:

Figure 1:
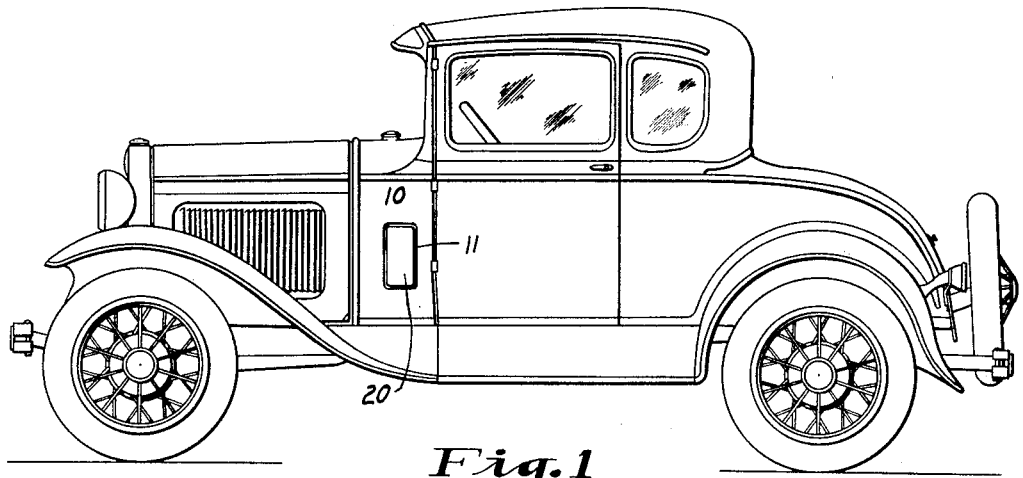
Figure 1 shows a side elevation of an automobile having my improved ventilating device installed thereon.
Figure 2:
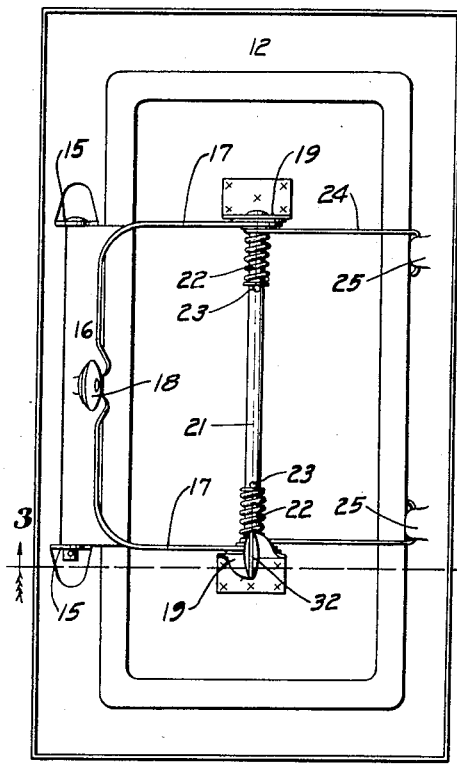
Figure 2 shows an inside view of the ventilator which is shown in Figure 1.

Referring to the accompanying drawing, I have used the reference numeral 10 to indicate generally the body of an automobile. The preferred embodiment of my improved device consists in providing a pair of rectangular openings 11, one on each side of the cowl supporting member of the body 10. A rectangular shaped frame 12 is secured to the inside of the body around each opening 11, each of which frames are provided with an outwardly opening channel 13 having a gasket 14 disposed in the bottom thereof which channel projects inwardly at the edges of the opening 11.

A pair of ears 15 are struck up from the metal of the frame member 12 to form a pair of vertically spaced pintles. A hinge wing 16 is pivotally mounted between these ears, the wing having a pair of arms 17 extending from each end thereof to position adjacent to the center of the opening 11. A lever 18 projects inwardly from the middle of the hinge 16 so that it may be manually oscillated around the ears 15. It will be noted that the free ends of the arms 17 describe arcuate paths through the center of each opening 11, as shown by the dotted line 26.

A rod 21 is rotatably mounted so as to extend in a vertical position between the free ends of the arms 17, and a pair of brackets 19 are riveted one to each end of the rod, which brackets extend outwardly through the opening 11. A vane 20, consisting of a flat rectangularly shaped plate slightly larger than the opening 11 is spot welded to the outer ends of the brackets 19 to thereby operatively close the opening 11. This vane has its edges curled inwardly to coact with the gasket 14 thereby forming a water tight joint between the vane and the frame 12. One of the brackets 19 is extended inwardly to form a handle 32 so that the vane 20 may be easily adjusted around the ends of the arms 17.

I have provided a novel device for insuring a non-rattling joint between the brackets 19 and the arms 17 which device also resiliently holds the ventilator in either the open or closed position. The rod 21 which forms the pivot on which the brackets 19 swing is provided with compression springs 22 extending between a pair of spaced transverse pins 23 and the arms 17 thereby resiliently urging the arms against the brackets to at all times prevent rattle between these members. One end of each of the springs 22 is extended laterally to the frame 12 where it is secured by means of a clip 25 punched from the material of the frame. The portion of the spring between the clip 25 and the rod 21 is bowed, as at 24, to resiliently urge the vane in either its open or closed position.

Figure 3:
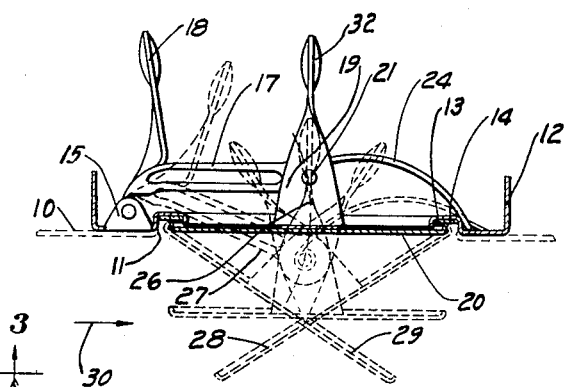
Figure 3 shows a sectional view taken on the line 3—3 of Figure 2.

Referring to Figure 3, the arms 17 swing in an arcuate path described by the dotted lines 26 and, as the bowed portion 24 of the spring is anchored by the clip 25 at the opposite side of the frame 12, the distance between the pivot point and the clip 25 is longer when the vane is either closed, as shown by the full lines in this figure, or open, as shown by dotted lines 27, than in any of its intermediate positions. Therefore, the bowed portion 24 must be further bowed as the vane is moved to an intermediate position so that this bowed portion tends to resiliently retain the ventilator in either the open or closed position.

I have shown two positions of the vane 20 when the device is open, one where the air is injected into the car and the other where it is being exhausted from the car. When the arms 17 are moved outwardly to the open position the brackets 19 may readily be pivoted around the rod 21 to thereby place the vane in the exhausting position, as shown by the dotted lines 28, or the vane may be moved to the injecting position, as shown by the dotted lines 29. It will be readily seen that when the vane 20 is in the position shown at 28 with the outside air flowing past in the direction of the arrow 30 due to the forward motion of the car, the air will be scooped into the body. However, when the vane is pivoted to the position shown by dotted lines 29 an exhaustion of the air will take place from the well known ejector principle.

If desired, the vane 20 may be moved parallel to the body 10 thereby causing very little if any air to either enter or be drawn out of the body. A nicety of adjustment may therefore be readily obtained by so positioning the vane.

Figure 4:
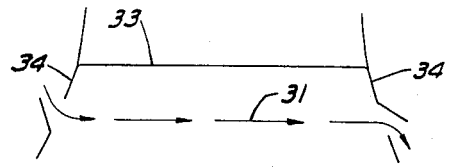
Figure 4 shows a diagrammatic view of a driver's compartment, illustrating the method by which I secure cross ventilation therethrough.

Referring to Figure 4, the forward portion of a car body is diagrammatically shown. As only the dash 33 is between this portion and the engine compartment the summer temperature around the driver's feet becomes uncomfortable. To illustrate the advantages of my improved ventilator I have shown one placed in each side of the cowl member 34. When the ventilator on one side is opened forwardly and the other ventilator opened rearwardly the air flows transversely across the car adjacent to the driver's feet in the direction of the arrow 31. Thus, dust or the like need not be blown up into the car to effectively cool this portion thereof.

Although I have shown and described a device for ventilating the driving compartment of a car, it will be apparent that other parts of the car, such as the engine compartment, may be likewise ventilated with this device. One or more of my ventilators may be substituted for the louvers in the hood and the device adjusted so that the ventilators at one side draw air into the engine compartment while the engine ventilators on the other side exhaust the air from the compartment to thereby provide a cross ventilation through the engine compartment. This is especially advantageous when used with a pair of ventilators, one on each side of the cowl as shown in Figure 4, for the reason that when the air flow through these compartments is in the same direction cool air is conducted into both compartments from one side of the car and the exhaust expelled from the other side of the car.

Among the many advantages arising from the use of my improved device, it may be well to mention that with my ventilator the amount of air injected or exhausted from the car may be conveniently regulated.

Further, my device is suitable for the ventilation of all vehicles including airplanes, trains, fast boats, and the like.

Some changes may be made in the arrangement, construction and combination of the various parts of my improved device without departing from the spirit of my invention, and it is my intention to cover by my claims such changes as may reasonably be included within the scope thereof.

I claim as my invention:

1. In a ventilator, a frame member defining a ventilating opening, an arm pivotally mounted on said frame so that its free end will swing toward and from said opening in an arcuate path, resilient means for urging said arm to either end of said path, and a vane pivotally mounted on the outer end of said arm in position to close said opening when the arm is in one of its positions.

2. In a ventilator, a frame member defining a ventilating opening, a pair of spaced ears struck from the material of said frame member, a pair of arms pivotally mounted on said ears so that their free ends swing toward and from said opening, a vane pivotally mounted on the outer ends of said arms so as to close said opening, means for resiliently urging said arms to either of its extreme positions, and means for manually adjusting the pivoting of said vane around said arms.

3. In a ventilator adapted to form a closure for an opening in an automobile cowl, an arm pivotally mounted so that its free end will swing toward and from said opening in an arcuate path, a rod extending through the outer end of said arm, a vane mounted on said rod in position to close said opening when the arm is in one of its positions, said rod forming a hinged connection between said vane and arm and a compression coil spring disposed around said rod resiliently urging said arm and adjacent portion of said vane into intimate frictional contact to thereby prevent rattle therebetween, said spring having one end thereof extending radially to that edge of said opening opposite the pivotal connection for said arm and anchored thereto, whereby the free end of said arm will be resiliently urged to either of its extreme positions.

4. In a ventilator, a frame member defining a ventilating opening, a pair of spaced arms pivotally mounted on said frame so that their free ends will swing toward and from said opening in arcuate paths, a rod connecting the free ends of said arms having a vane mounted thereon in position to close said opening when the arms are in one of their extreme positions, said rod forming a hinged connection between said vane and arms, and a pair of compression coil springs disposed around said rod resiliently urging said arms into frictional engagement with the adjacent portion of said vane, said compression springs having one end thereof extending radially to the side of said frame opposite the pivotal connections of said arms and anchored thereto, whereby said vane will be resiliently urged to either of its extreme positions.

5. In a ventilator adapted to form a closure for an opening in an automobile cowl, a pair of spaced arms pivotally mounted on said cowl adjacent to one side of said opening so that the free ends thereof will swing toward and from the opening in arcuate paths, a vane pivotally mounted on the free ends of said arms in position to close said opening when each of the arms is in a similar extreme position, and a spring extending from each of the pivotal connections with said vane to the edge of said opening opposite the pivotal connections of said arms, said springs being anchored to said frame, whereby said arms will be resiliently urged to either of their extreme positions by the flexing of said springs.

JOSEPH GALAMB.